(12) United States Patent
Ozeki

(10) Patent No.: US 11,925,189 B2
(45) Date of Patent: Mar. 12, 2024

(54) GUMMY COMPOSITION AND METHOD FOR PRODUCING THE SAME

(71) Applicant: TAIYO KAGAKU Co., Ltd., Yokkaichi (JP)

(72) Inventor: Makoto Ozeki, Yokkaichi (JP)

(73) Assignee: TAIYO KAGAKU CO., LTD., Yokkaichi (JP)

( * ) Notice: Subject to any disclaimer, the term of this patent is extended or adjusted under 35 U.S.C. 154(b) by 0 days.

(21) Appl. No.: 17/649,606

(22) Filed: Feb. 1, 2022

(65) Prior Publication Data

US 2022/0273000 A1 Sep. 1, 2022

(30) Foreign Application Priority Data

Feb. 26, 2021 (JP) .................. 2021-029360

(51) Int. Cl.
| | |
|---|---|
| A23G 3/42 | (2006.01) |
| A23G 3/50 | (2006.01) |
| A23L 29/00 | (2016.01) |
| A23L 29/20 | (2016.01) |

(52) U.S. Cl.
CPC .............. A23G 3/42 (2013.01); A23G 3/50 (2013.01); A23L 29/045 (2016.08); A23L 29/20 (2016.08); A23G 2200/04 (2013.01); A23G 2200/06 (2013.01)

(58) Field of Classification Search
None
See application file for complete search history.

(56) References Cited

U.S. PATENT DOCUMENTS

| | | | | |
|---|---|---|---|---|
| 4,847,098 A | * | 7/1989 | Langler | ............... A23L 21/18 426/282 |
| 6,403,140 B1 | * | 6/2002 | Tiainen | ............... A23G 3/44 426/576 |
| 6,589,566 B2 | | 7/2003 | Ueda et al. | |
| 10,905,764 B2 | | 2/2021 | Kogiso et al. | |
| 2004/0241294 A1 | | 12/2004 | Barabolak et al. | |
| 2006/0034976 A1 | * | 2/2006 | Cotten | ............... A23G 3/54 426/103 |
| 2006/0211721 A1 | | 9/2006 | Roberts | |
| 2009/0011108 A1 | | 1/2009 | Kogiso et al. | |
| 2011/0183925 A1 | * | 7/2011 | Sato | ............... A61P 43/00 530/331 |
| 2015/0080469 A1 | | 3/2015 | Kogiso et al. | |
| 2018/0236083 A1 | | 8/2018 | Kogiso et al. | |

FOREIGN PATENT DOCUMENTS

| | | |
|---|---|---|
| JP | H04173046 A | 6/1992 |
| JP | H05137513 A | 6/1993 |
| JP | H06169696 A | 6/1994 |
| JP | H0847383 A | 2/1996 |
| JP | 2001299266 A | 10/2001 |
| JP | 2008220281 A | 9/2008 |
| JP | 2010154784 A | 7/2010 |
| WO | WO-0128359 A1 * | 4/2001 ............... A23G 3/48 |
| WO | WO-2015028994 A1 * | 3/2015 ............... C12Q 1/18 |

OTHER PUBLICATIONS

Yamamoto et al., Antidepressant like . . . mice; Neuropeptides, 51—pp. 25-29-2015 (Year: 2015).*

* cited by examiner

Primary Examiner — Jyoti Chawla
(74) Attorney, Agent, or Firm — J-TEK LAW PLLC; Jeffrey D. Tekanic; Scott T. Wakeman

(57) ABSTRACT

A raw material for a gummy composition, and a gummy candy composed of the gummy composition, contain pyroglutamic acid, preferably in an amount of 0.08 mass % to 1.5 mass %. By adding pyroglutamic acid, the gummy candy has an improved melt-in-the-mouth feeling, while also being non-adhesive and soft, and having improved flavor release during chewing.

20 Claims, 9 Drawing Sheets

GUMMY COMPOSITION AND METHOD FOR PRODUCING THE SAME

CROSS-REFERENCE

The present application claims priority to Japanese patent application no. 2021-029360 filed on Feb. 26, 2021, the contents of which are incorporated herein by reference.

TECHNICAL FIELD

The invention generally relates to a gummy composition and a method for producing the same. Especially, it relates to a gummy candy which has an improved melt-in-the-mouth feeling that is non-adhesive, and a good flavor release.

BACKGROUND ART

Gummy candies are one known type of chewable candy. Gummy candies are typically made using gelatin as a gelling agent. Such a chewable candy has a gum-like texture. With the expansion of the gummy candy market, gummy candies having various textures have been developed.

For example, gummy candies are known that have soft elasticity (Patent Document 1), are chewable with a constant force owing to the application of oil and fat (Patent Document 2), or have a gummy-like texture owing to the use of a raw material other than gelatin (Patent Document 3).

In addition, gummy candies having a soft-texture and a better melt-in-the-mouth feeling are becoming preferred, and better melt-in-the-mouth feeling gummy candies are also known (Patent Documents 3, 4).

Glyceride diacetyl tartrate monostearate, which is a type of emulsifier, is known to be suitable as a starch adsorbent and a gluten modifier for improving the texture of baked confectionery such as bread and biscuits (Patent Document 5).

It is also known to use gummy compositions for pharmaceutical compositions.

PRIOR ART PATENT DOCUMENTS

Patent document 1: JP H6-169696 A
Patent document 2: JP 2008-220281 A
Patent document 3: JP H5-137513 A
Patent document 4: JP 2010-154784 A
Patent document 5: JP H4-173046 A

SUMMARY OF THE INVENTION

Gummy candy is a resilient (elastic, gum-like) confectionery that mainly uses gelatin as a gelling agent to impart a rubber-like (gum-like, elastic) texture when chewed. In order to give a new texture and melt-in-the-mouth feeling, in the past it has been necessary to increase the moisture content or to add dextrins, polysaccharides, oils and fats, or the like. However, introducing such additives complicates the manufacturing process, and creates disadvantages such as product aggregation (clumping, adherence) during transport and storage, and difficulty in long-term storage.

It is therefore one, non-limiting aspect of the present teachings to disclose techniques for formulating a gummy composition or candy that does not affect taste, reduces adherence to manufacturing equipment during production, and reduces aggregation after production. In another non-limiting aspect of the present teachings, techniques are disclosed for making a gummy composition or candy which has a pleasant feeling in the mouth and a pleasant texture without increasing the moisture content or adding dextrin or polysaccharides and fats and oils, and which has good flavor release at the time of eating. Such a gummy composition or candy is suitable for mass production.

According to another non-limiting aspect of the present teachings, a gummy composition preferably contains pyroglutamic acid. For example, it is preferable that the content of the pyroglutamic acid is 0.08 mass % to 1.5 mass % of the total mass of the gummy composition. Optionally, the gummy composition may be in the form of a gummy candy.

According to another non-limiting aspect of the present teachings, a method for producing a gummy composition containing pyroglutamic acid preferably comprises: (1) dissolving raw materials by boiling a mixture of raw materials containing a saccharide or other type of sweetener (natural or artificial), water and an emulsifier; (2) adding a gelling agent dissolved in water; (3) mixing the dissolved mixture and gelling agent to make a gummy composition; and (4) molding the gummy composition to form an intended shape. The pyroglutamic acid may be added in any of the above steps (1), (2) or (3).

It is preferable that the gummy composition is provided in the form of a gummy candy.

According to another non-limiting aspect of the present teachings, a method for reducing adhesion of gummy candy to a manufacturing apparatus during manufacturing and reducing aggregation after manufacture comprises introducing pyroglutamic acid into the gummy composition at any time (stage) during the manufacture of the gummy composition.

According to another non-limiting aspect of the present teachings, a gummy candy is provided with a better melt-in-the-mouth feeling, a good non-adhesive (crisp, al dente) texture and a good flavor, owing to the presence of pyroglutamic acid in the gummy candy.

According to the present teachings, it is possible to provide a novel gummy composition or candy which has an improved melt-in-the-mouth feeling and a good non-adhesive texture and has a good flavor at the time of eating. Further, it is possible to provide a manufacturing method capable of mass-producing a gummy composition or candy which reduces adhesion to a manufacturing apparatus during manufacturing and aggregation (clumping) of the gummy composition or candy after the manufacture.

BRIEF DESCRIPTION OF THE DRAWINGS

FIGS. 1A-1C show schematic diagrams for measuring texture using a creepmeter, wherein FIG. 1A shows the state before texture measurement, FIG. 1B shows the state during the texture measurement, and FIG. 1C shows the state after the texture measurement has been completed.

DETAILED DESCRIPTION OF THE INVENTION

Figure 1:
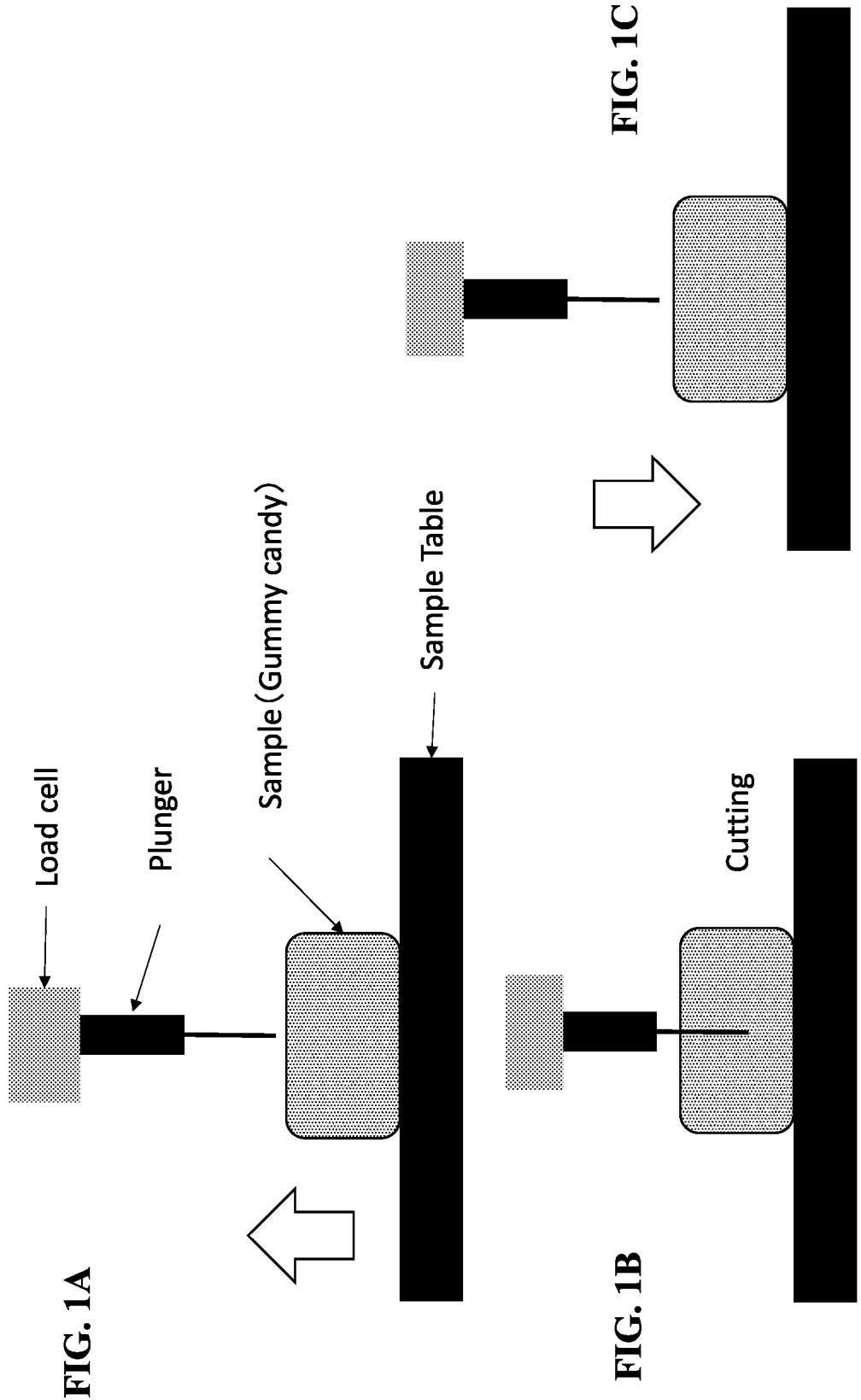

Next, some embodiments of the present teachings will be described with reference to Figures. The technical scope of the invention is not limited by these embodiments, and can be implemented in various forms without changing the gist of the invention.

In the present disclosure, the term "gummy composition" means an oral (edible) composition that may contains, e.g., gelatin, as a main gelling agent (or emulsifier) and has a rubber-like (elastic) texture. For example, one type of gummy composition is a gummy candy. Examples of this type of the gummy composition include a hard texture gummy, a soft texture gummy, a gummy with powder on the surface, and a gummy with a coating, but there is no particular limitation on the type of gummy candy that may be formulated according to the present teachings.

Exemplary forms of gummy compositions of the present teachings are a confectionery, a supplement having an active ingredient, a nutritional food, an oral medicine, etc.

For example, substances (active ingredients) that optionally may be contained in the gummy composition include, but are not limited to, vitamins such as vitamin B1, vitamin B2, vitamin B12, vitamin C, vitamin D, vitamin E, vitamin K, pantothenic acid, biotin, and lycopene, etc.; medicines for the stomach such as betaine hydrochloride, carnitine hydrochloride, carnitine chloride, and bethanechol, etc.; herbal extracts and Chinese medicines such as ginseng, Coix seed, processed garlic, *Ephedra*, Nandina, cinnamon, gentian, citrus peel, *Swertia japonica, Tetradium ruticarpum, Atractylodes lancea*, clove, aloe, hop, *Pueraria* Decoction, *Cassia* Twig Decoction, *Bupleurum* and *Cassia* Twig Decoction, *Ephedra* Decoction, Shosaikoto, and Minor Blue Dragon Decoction, etc.; antipyretics and/or analgesics such as aspirin, acetaminophen, ethenzamide, ibuprofen, and salicylamide, etc.; expectorants such as noscapine hydrochloride and noscapine, etc.; antidiarrheals such as acrinol, berberine chloride, creosote, tannic acid, scopolamine hydrobromide, methyl atropine bromide, papaverine hydrochloride, and ethyl aminobenzoate, etc.; antihistamines such as diphenylpyramine hydrochloride, diphenhydramine hydrochloride, chlorpheniramine maleate, and arimemazine tartrate, etc.; antitussives such as dextromethorphan hydrobromide, pipetidine hibenzate, and dihydrocodeine phosphate, etc.; minerals such as calcium, sulfur, zinc, selenium, and iron, etc.; proteins such as soy protein, egg white powder, and whey protein, etc.; amino acids such as glycine, alanine, aspartate, cystine, phenylalanine, tryptophan, and γ-aminobutyric acid, etc.; fatty acids such as EPA, DHA, linolenic acid, α-linolenic acid, etc.; dyes such as caramel dye, *gardenia* dye, anthocyanin dye, annatto dye, paprika dye, safflower dye, safflower malt dye, flavonoid dye, cochineal dye, amaranth, erythrosine, Arla Red AC, New Coccin (Cochineal Red A), phloxine, rose bengal, acid red, tartrazine, Sunset Yellow FCF, Fast Green FCF, Brilliant Blue FCF, and indigo carmine, etc.; flavoring agents (flavorants) such as flavors and essences of various fruits; seasonings such as malate and its salts, acetic acid and its salts, salts, glutamic acid and its salts, mirin containing alcohol, vinegar juice, and fragments or powder of vegetables, fruits and seafood, etc.; mushrooms or their extracts, such as *agaricus*, shiitake mushroom extract, *reishi*, and yamabushitake, etc.; preservatives; pH adjusters; other functional/therapeutic materials such as chondroitin sulfate, glucosamine, hyaluronic acid etc. The gummy composition may contain a single active ingredient and/or pharmaceutical composition or in a combination of two or more. The content of the active ingredient(s) and/or the pharmaceutical composition(s) is set appropriately according to the type of ingredient(s) and its (their) application.

Examples of the raw materials which can be used in the present teachings include the following.

As the gelling agent, for example, gelatin or pectin is used. The gelatin may be derived from various materials such as bone and/or skin of an animal and/or scales of a fish. Other gelling agents can also be used, as long as an oral (edible) composition can be formed therewith. As the saccharide (sweetener), granulated sugar (e.g., sucrose), sugar such as supernatant white sugar, other disaccharides, sugar alcohols such as sorbitol, reduced sugar syrup, acid-sugar syrup, enzymatically-degraded water syrup, monosaccharide, trisaccharide, oligosaccharide, trehalose, isomaltose, corn syrup, and the like can be used. If a reducing isomaltose is used, then the product may be called "sugarless" or "sugar-free". Sugar substitutes or artificial sweeteners also may be used to make "sugar-free" formulations, such as, e.g., allulose, acesulfame potassium, aspartame, mogrosides (monk fruit), saccharin, steviol glycosides, sucralose, and other types of sugar alcohols, such as xylitol, mannitol, erythritol, and lactitol.

Fruit juices derived from one or more of, e.g., apples, grapes, strawberries, kiwis, pears, etc.; vegetable juices derived from one or more of, e.g., peppers, spinach, celery, bell peppers, kale, cabbage, watercress, etc., or mixtures thereof also can be utilized in gummy compositions according to the present teachings.

In addition to the above, dried fruits, mucopolysaccharides (glycosaminoglycans), starches, acidulants (e.g., citric acid), fragrances, colorants (food coloring), and the like can be used if necessary.

Pyroglutamic acid, as used in the present teachings, is a cyclic amino acid in which a γ carboxyl group and an a amino group of glutamic acid are intramolecularly dehydrated and condensed. The L isomer may be used (either alone or substantially only L isomers, e.g., 90% or more L isomers), or the D isomer (either alone or substantially only D isomers, e.g., 90% or more D isomers) may be used or a mixture of L and D isomers (e.g., wherein each isomer is present in a range of 20-80%) may be used. Preferably the L isomer of the pyroglutamic acid can be used. Pyroglutamic acid is known to accumulate in large quantities during the fermentation and ripening of miso and soy sauce by undergoing a non-enzymatic cyclization reaction of the flavor-enhancer glutamic acid isolated from the raw material protein. Pyroglutamic acid is tasteless and odorless, has good solubility in water, and is transparent when dissolved in water. Therefore, adding pyroglutamic acid to the gummy composition does not affect the taste, odor, color, etc. of the gummy itself. The content of pyroglutamic acid is preferably 0.02% by mass or more, more preferably 0.08% by mass or more, based on the total mass of the gummy composition of the final product.

For example, the gummy composition and the gummy candy can be produced as follows.

An emulsifier and a sweetener (e.g., a saccharide or other type of sweetener, natural or artificial) are added to water, and the mixture is boiled to obtain a condensate syrup (main raw materials dissolving step). A gelatin, which was previously dissolved in hot water at about 60° C., is mixed with the condensate syrup (gelling agent adding step). If necessary, auxiliary raw materials such as fruit juice and flavor are added (auxiliary raw materials addition step). These are mixed thoroughly to obtain a gummy composition or gel, i.e. a thick, viscous liquid (mixing step). The mixture is molded using conventional gummy candy molding methods, such as starch molds, to form the intended shape (molding step). After removing from the mold vessel, one or more of an oil and fat, a brightener, a granulated sugar, an acidulant, a powdered obrato, a starch, a powdered calcium, a powdered magnesium, or the like can be applied to the surface of the gummy candy, if necessary or desired (surface coating step).

Pyroglutamic acid may be included (introduced) in any of the above-noted main raw materials dissolving step, gelling agent adding step, and/or auxiliary raw materials addition step. However, since the auxiliary raw materials addition step is an optional step, it is preferable to add it in either of the main raw materials dissolving step or the gelling agent addition step. Since process management is easily performed by mixing it as the main raw material, it is preferable to mix it in the main raw materials dissolving step.

Hereinafter, working examples will be described, but the present teachings are not limited thereto.

Comparative Example 1—Control Gummy Candy

Three thousand grams of 100% citrus juice, 820 grams of water, 2000 grams of granulated sugar (sucrose), and 500 grams of a gelling agent (neosoft GE-361: manufactured by Taiyo Kagaku Co., Ltd., which is an emulsifier containing gelatin as a main component) were mixed and dissolved in a hot water bath. Three thousand five hundred grams of granulated sugar were mixed into the mixture. One hundred fifty grams of citric acid dissolved in 500 grams of water was added and heated to condense until reaching a value of 75 Brix (° Bx). Thereafter, the heating was stopped, and 30 grams of the citrus juice fragrance was added and mixed well to obtain about 10 kilograms of the gummy candy base raw material mixture (gel or viscous liquid). The gummy candy base raw material mixture was poured into a mold vessel according to a conventional method, cooled, solidified, and then dried. After drying, individual gummy candies were removed from the mold vessel, and a suitable amount of a mixture of starch, calcium carbonate, and magnesium carbonate powder was applied to the surfaces thereof. A rectangular gummy candy having a mass of about 6.5 grams per piece, a longitudinal size (length) of about 15 mm×a transverse size (length) of about 25 mm×a thickness of about 10 mm was obtained. This sample was identified as Comparative Example 1.

When removing Comparative Example 1 from the mold vessel, the adhesiveness between the gummy candy and the mold vessel was strong, and the gummy candy could not be easily removed. When two pieces of Comparative Example 1 were placed on top of each other, the products aggregated (stuck, adhered, clumped) to each other. The melt-in-the-mouth feeling and flavor were similar to conventional products and the texture was not a desired non-adhesive (crisp, al dente) texture.

Comparative Example 2—Gummy Candy Containing 1.5% Glutamic Acid

Three thousand grams of 100% citrus juice, 670 grams of water, 2000 grams of granulated sugar (sucrose), and 500 grams of a gelling agent (neosoft GE-361: manufactured by Taiyo Kagaku Co., Ltd.) and 150 grams of L-glutamic acid (manufactured by Tokyo Kasei Kogyo Co., Ltd.) were mixed and dissolved in a hot water bath. Three thousand five hundred grams of granulated sugar were mixed with the dissolving mixture, and 150 grams of citric acid dissolved in 500 grams of water was added and heated to condense until reaching a value of 75 Brix (° Bx). Thereafter, 30 grams of citrus juice fragrance was added and mixed well to obtain about 10 kilograms of gummy candy base raw material mixture (gel or viscous liquid). The gummy candy base raw material mixture was poured into a mold vessel according to a conventional method, cooled, solidified, and then dried. After drying, individual gummy candies were removed from the mold vessel, and a suitable amount of a mixture of starch, calcium carbonate, and magnesium carbonate powder was applied to the surfaces thereof. A rectangular gummy candy having a mass of about 6.5 grams per piece, a longitudinal size (length) of about 15 mm×a transverse size (length) of about 25 mm×a thickness of about 10 mm was obtained. This sample was identified as Comparative Example 2.

When Comparative Example 2 was removed from the mold vessel, the adhesiveness between the gummy candy and the mold vessel was strong, and the gummy candy could not be easily removed. When two pieces of Comparative Example 2 were placed on top of each other, the products aggregated (stuck, adhered, clumped) to each other. The melt-in-the-mouth feeling and flavor were similar to the conventional product, and a strong taste of glutamate was observed. It did not have a desired good texture.

Example 1—Gummi Candy Containing 0.08% Pyroglutamic Acid

Three thousand grams of 100% citrus juice, 812 grams of water, 2000 grams of granulated sugar (sucrose), 500 grams of a gelling agent (neosoft GE-361: manufactured by Taiyo Kagaku Co., Ltd.), and 8 grams of L-pyroglutamic acid (manufactured by Tokyo Kasei Kogyo Co., Ltd.) were mixed and dissolved in a hot water bath. Three thousand five hundred grams of granulated sugar were mixed into the mixture. One hundred fifty grams of citric acid dissolved in 500 grams of water was added and heated to condense until reaching a value of 75 Brix (° Bx) (main raw material dissolving step). Thereafter, the heating was stopped, and 30 grams of the citrus juice fragrance was added thereto (auxiliary raw material addition step) and mixed well (mixing step), thereby obtaining about 10 kilograms of the gummy candy base raw material mixture (gel).

The gummy candy base raw material mixture was poured into a mold vessel according to a conventional method, cooled, solidified, and dried (molding step). Individual gummy candies were removed from the post-drying mold vessel, and a mixture of starch, calcium carbonate, and magnesium carbonate powder was applied to the surfaces thereof in an appropriate amount (surface coating step). A gummy candy having a mass of about 6.5 grams per piece, a longitudinal size (length) of about 15 mm×a transverse size (length) of about 25 mm×a thickness of about 10 mm was obtained. This sample was identified as Example 1.

When Example 1 was removed from the mold vessel, little adhesiveness between the gummy candy and the mold vessel was observed, and the gummy candy could be easily removed. When two pieces of Example 1 were overlaid, a slight adherence was observed between the products. As compared with Comparative Example 1, Example 1 was chewy, had a good flavor of orange and a good melt-in-the-mouth feeling at the time of eating, and had a non-adhesive (crisp, al dente) texture. The taste did not differ greatly from that of Comparative Example 1.

Example 2—Gummi Candy Containing 0.1% Pyroglutamic Acid

Three thousand grams of 100% citrus juice, 810 grams of water, 2000 grams of granulated sugar (sucrose), 500 grams of a gelling agent (neosoft GE-361: manufactured by Taiyo Kagaku Co., Ltd.) and 10 grams of L-pyroglutamic acid (manufactured by Tokyo Kasei Kogyo Co., Ltd.) were mixed and dissolved in a hot water bath. Three thousand five hundred grams of granulated sugar were mixed into the mixture. One hundred fifty grams of citric acid dissolved in 500 grams of water was added and heated to condense until reaching a value of 75 Brix (° Bx). Thereafter, the heating was stopped, and 30 grams of the citrus juice fragrance was added and mixed well to obtain about 10 kilograms of the gummy candy base raw material mixture (gel or viscous liquid).

The gummy candy base raw material mixture was poured into a mold vessel according to a conventional method, cooled, solidified, and dried. After drying, individual gummy candies were removed from the mold vessel, and a suitable amount of a mixture of starch, calcium carbonate, and magnesium carbonate powder was applied to the surfaces thereof. A gummy candy having a mass of about 6.5 grams per piece, a longitudinal size (length) of about 15 mm×a transverse size (length) of about 25 mm×a thickness of about 10 mm were obtained. This was identified as Example 2.

When Example 2 was removed from the mold vessel, there was no adhesiveness with the mold vessel, and it could be easily taken out. When two pieces of Example 2 were overlaid, the products did not adhere to each other. The flavor of orange was good at the time of eating, and a good melt-in-the-mouth feeling and a good non-adhesive (crisp, al dente) texture were observed. The taste did not differ greatly from that of Comparative Example 1.

Example 3—Gummi Candy Containing 1.5% Pyroglutamic Acid

Three thousand grams of 100% citrus juice, 670 grams of water, 2000 grams of granulated sugar (sucrose), 500 grams of a gelling agent (neosoft GE-361: manufactured by Taiyo Kagaku Co., Ltd.) and 150 grams of L-pyroglutamic acid (manufactured by Tokyo Kasei Kogyo Co., Ltd.) were mixed and dissolved in a hot water bath. Three thousand five hundred grams of granulated sugar were mixed into the mixture. One hundred fifty grams of citric acid dissolved in 500 grams of water was added and heated to condense until reaching a value of 75 Brix (° Bx). Thereafter, the heating was stopped, and 30 grams of the citrus juice fragrance was added and mixed well to obtain about 10 kilograms of the gummy candy base raw material mixture (gel or viscous liquid).

The gummy candy base raw material mixture was poured into a mold vessel according to a conventional method, cooled, solidified, and dried. After drying, individual gummy candies were removed from the mold vessel, and a suitable amount of a mixture of starch, calcium carbonate, and magnesium carbonate powder was applied to the surfaces thereof. A gummy candy having a mass of about 6.5 grams per piece, a longitudinal size (length) of about 15 mm×a transverse size (length) of about 25 mm×a thickness of about 10 mm was obtained. This sample was identified as Example 3.

When Example 3 was removed from the mold vessel, there was no adhesiveness with the mold vessel, and it could be easily taken out. When two pieces of Example 3 were overlaid, the products did not adhere to each other. The flavor of the orange was good at the time of eating, and a good melt-in-the-mouth feeling and a good non-adhesive (crisp, al dente) texture were observed. The taste did not differ greatly from that of Comparative Example 1.

Evaluation 1—Texture Test

For the texture test, an explanation and the measurement conditions are provided below.

FIGS. 1A-1C schematically illustrate how the texture measurement was performed using a creep meter (i.e. a tensile and compression testing machine). The creep meter has a sample table 4, which supports a sample piece 3 of the gummy candy, and a load cell 1 disposed above it. The load cell 1 can measure both pushing (compression) and pulling (tensile) forces. A suitable plunger 2 (i.e. a compression instrument) is attached to the load cell 1, depending on the sample to be measured. The sample table 4 is caused to move slowly upward X or downward Y with a sample 3 mounted thereon.

Texture testing is performed as follows: As shown in FIG. 1A, sample 3 is mounted on the sample table 4 with the sample table 4 in a lowered position. At this time, the sample 3 is spaced apart from the plunger 2.

Next, by raising the sample table 4 in the X direction, the sample 3 makes contact with the plunger 2 as shown in FIG. 1B, and the load is measured while pressing on the sample 3. When the sample table 4 is further raised, the plunger 2 sticks (pierces) into the sample 3.

Next, as shown in FIG. 1C, the sample table 3 is lowered in the Y direction, and the plunger 2 is separated from sample 2.

In addition, a second compression/tensile test was carried out by moving the sample table 4 in the upward and downward directions one more time.

Figure 2:
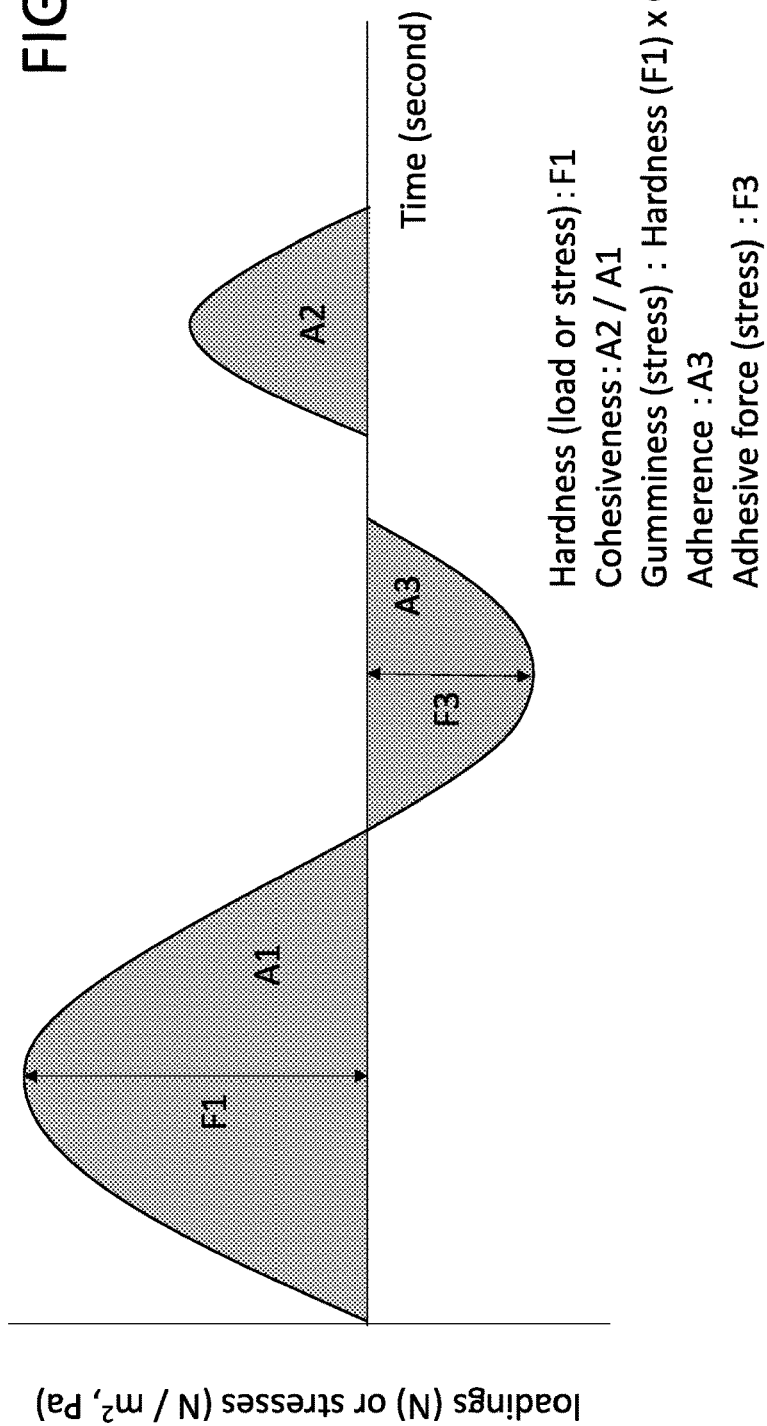
FIG. 2 shows a schematic diagram of the results of a texture measurement.

The load or stress applied to the plunger 2 during the above operation (load: N, stress: Pa) was measured over time. A representative graph (chart) showing the texture test result is shown in FIG. 2. The horizontal axis in FIG. 2 represents time (in seconds) and the vertical axis represents loadings (N) or stresses (in N/m$^2$, i.e. Pa). The reference symbol F1 in the FIG. 2 indicates "load" or "stress"; the "area" of reference symbols A1 to A3 indicates the integral value of the measured loads; and reference symbol F3 indicates the "adhesive force (stress)". The area A2 divided by the area A1 (A2/A1) is "cohesive", indicating the fraction of the sample that remains resilient after chewing once. The value (F1×A2/A1), i.e. the load multiplied by the cohesiveness, is the gummy load or gumminess (stress), indicating the feeling when chewed a second time. F3 shows the adhesive force (stress) and A3 shows the adherence. Thus, F3 and A3 show the pulling (tensile) force of the plunger 2 from the sample 3 when the sample table 4 descends. These values indicate the chewing sample viscosity in the mouth.

The measurement conditions of the texture test are shown below. Measurement instrument: YAMADEN Rheoner II Creepmeter RE2-3305B Plunger to be used: Wire plunger (diameter 0.3 mm)

Samples: A quadrate sample having a weight of about 6.5 grams per piece, and a size of about 15 mm×25 mm×10 mm Measuring conditions: Plunger moving speed: 10 mm/sec, Temperature at measurement: 20° C., Humidity: 60%

Measured strain rate: 70%

For Comparative Examples 1 and 2 and Examples 1 to 3, measurements were performed in accordance with the method described in the above texture test. Measurements were performed on 11 samples (pieces) of Comparative Example 1, 7 samples (pieces) of Comparative Example 2, 11 samples (pieces) of Example 1, 11 samples (pieces) of Example 2, and 11 samples (pieces) of Example 3.

The test results are shown in FIGS. 3-7.

Figure 3:
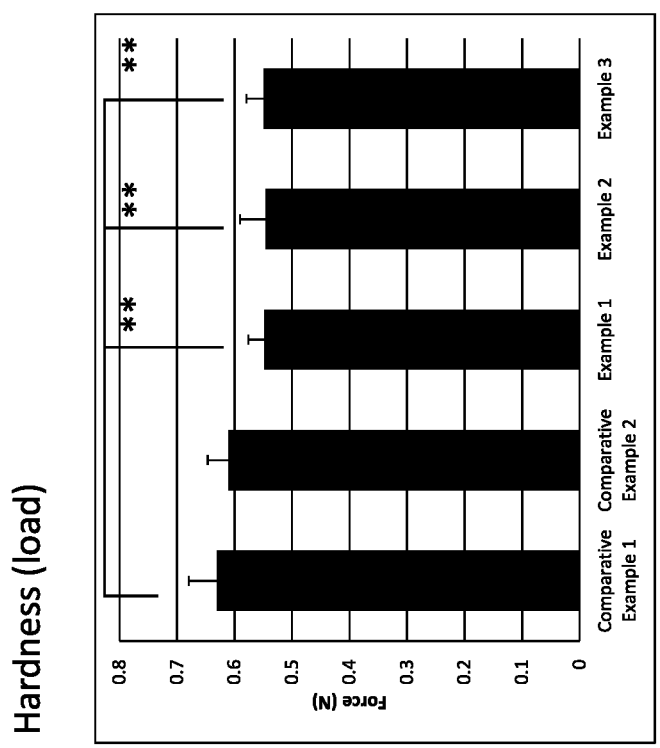
FIG. 3 shows a graph of the results of the hardness (load) of texture measurements. Data are presented as mean±S.D. (standard deviation). Statistical analysis between groups was performed by student's t-test; * indicates $p \leq 0.05$ and ** indicates significant differences at $p \leq 0.01$ (also in FIGS. 4-9).

FIG. 3 shows a graph summarizing the results of the hardness (load) stress measurements. There was no significant difference between Comparative Example 1 and Comparative Example 2. On the other hand, the load values of Examples 1-3 were significantly lower than Comparative Examples 1 and 2. It was found that pyroglutamic acid caused the gummy candy to soften and thus impart a soft texture.

Figure 4:
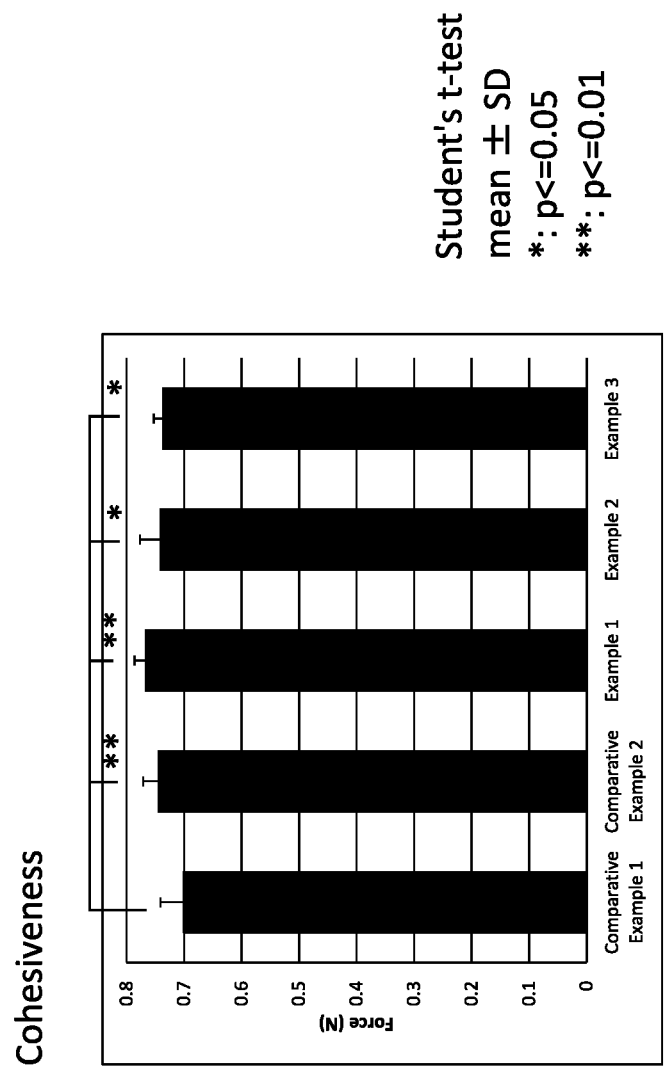
FIG. 4 shows a graph of the cohesiveness results for the texture measurements.

FIG. 4 shows a graph summarizing the results of cohesiveness measurements. The load values of Comparative Example 2 and Examples 1-3 were significantly higher than Comparative Example 1. It was found that glutamic acid and pyroglutamic acid increased the elasticity of the gummy composition (candy), increased the elasticity in the first chewing, and had the effect of feeling the tooth prick (crispness, al dente).

Figure 5:
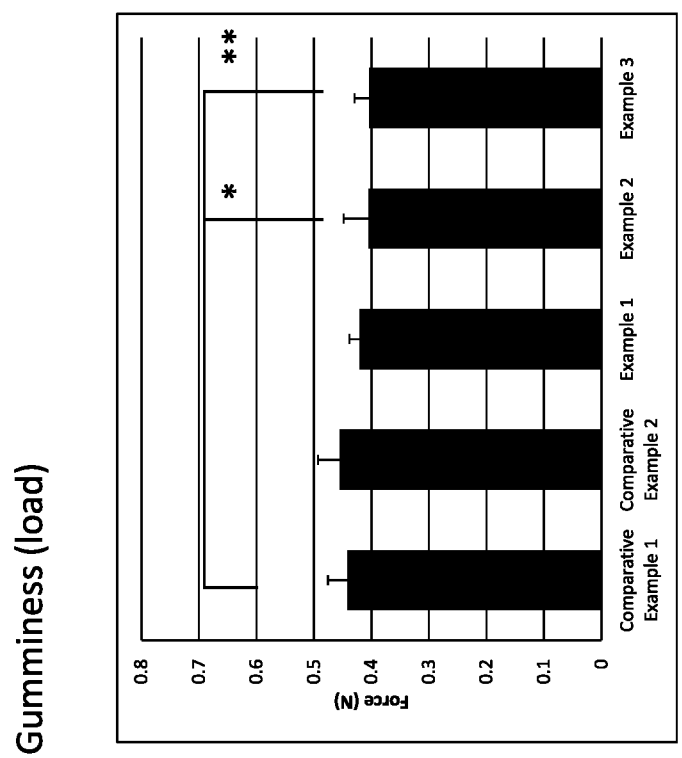
FIG. 5 shows a graph of the gumminess (load) results for the texture measurements.

FIG. 5 shows a graph summarizing the results of the gumminess (load) measurements. Here, it is noted that gumminess is calculated by multiplying hardness (F1) and cohesiveness (A2/A1). The gumminess (load) was not significantly different between Comparative Example 1 and both Comparative Example 2 and Example 1. On the other hand, the gumminess values of Example 2 and Example 3 were significantly lower than Comparative Example 1. It was found that pyroglutamic acid makes the structure susceptible to fracture in the first compression deformation, and it has the effect of feeling soft when the gummy composition (candy) is chewed the second time.

Figure 6:
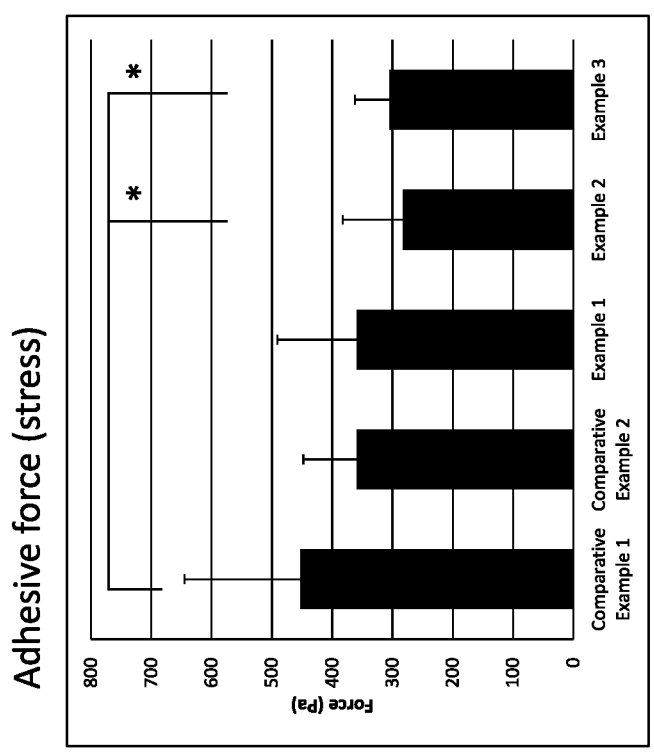
FIG. 6 shows a graph of the adhesive force (stresses) results for the texture measurements.

FIG. 6 shows a graph summarizing the results of the adhesive force (stress) measurements. The adhesive force (stress) was not significantly different between Comparative Example 1 and both Comparative Example 2 and Example 1. On the other hand, the adherence force values of Example 2 and Example 3 were significantly lower than Comparative Example 1. It was found that pyroglutamic acid weakened the pulling (tensile) force on the plunger on the sample when the sample table descended; in addition, it did not provide a sticky feeling in the mouth, and it had the effect of enhancing a non-adhesive (crisp, al dente) texture.

Figure 7:
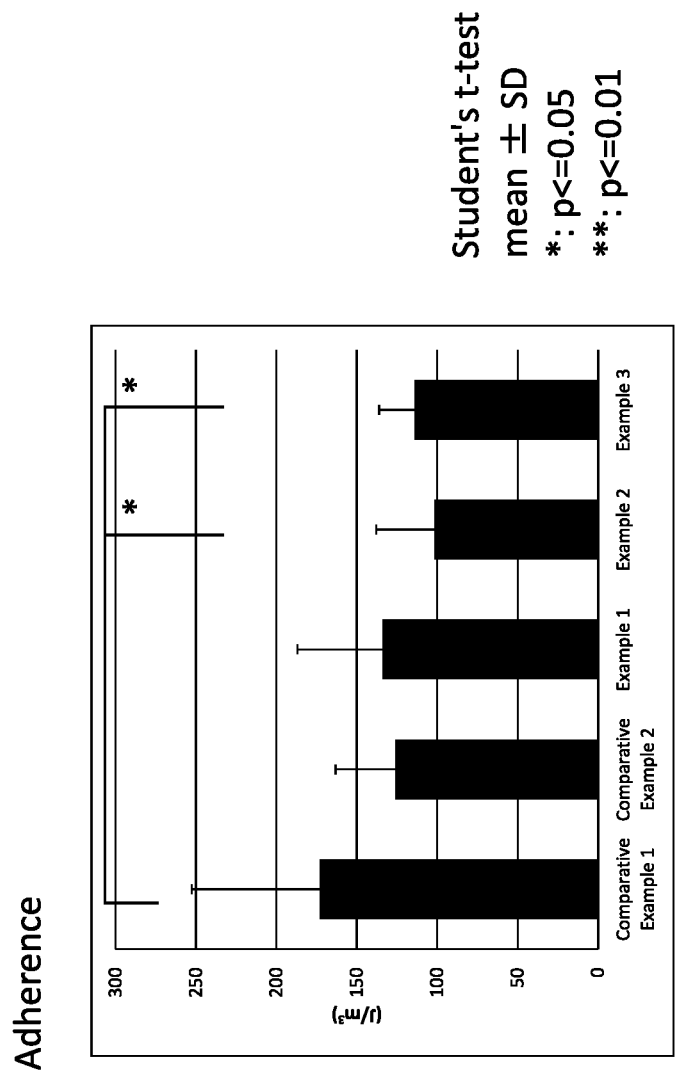
FIG. 7 shows a graph of the adherence results for the texture measurements.

FIG. 7 shows a graph summarizing the results of the adherence measurements. The adherence was not significantly different between Comparative Example 1 and both Comparative Example 2 and Example 1. On the other hand, the adherence of Example 2 and Example 3 were significantly lower than Comparative Example 1. It was found that pyroglutamic acid weakened the pulling force of the plunger on the sample when the sample table descended, and it did not have a sticky feeling in the mouth, and it had the effect of enhancing a non-adhesive (crisp, al dente) texture.

Based on the above-noted results, it was proven that the pyroglutamic acid was able to impart a non-adhesive (crisp, al dente) texture during continued chewing, even though the hardness is soft on the food texture of the gummy, and even though the initial chewing response is resilient.

Evaluation 2—Comparison of Sensory Evaluations

For Comparative Examples 1 and 2 and Examples 1 to 3, a sensory evaluation test was performed by a panel of specialists. The results are shown in Table 1.

The "texture" indicates whether or not a desired mouth feel and a non-adhesive (crisp, al dente) texture are combined. The fragrance (flavor release) represents the quality and strength of the flavor that is sensed from the nose when the gummy is eaten after 1 month of storage at 25° C.

TABLE 1

| Sample | Texture | Flavor release | Results |
| --- | --- | --- | --- |
| Comparative Example 1 | x | x | Not the expected texture. Poor aroma and change in aroma quality. |
| Comparative Example 2 | x | x | Not the expected texture. Poor aroma and change in aroma quality. |
| Example 1 | Δ | ○ | It feels somewhat non-adhesive. Good aroma. |
| Example 2 | ○ | ○ | Good melt-in-the-mouth feeling and good non-adhesiveness. Good aroma. |
| Example 3 | ○ | ○ | Good melt-in-the-mouth feeling and good non-adhesiveness. Good aroma. |
| Example 4 | x | x | Not the expected texture. Poor aroma and change in aroma quality. |
| Example 5 | ○ | ○ | Good melt-in-the-mouth feeling and good non-adhesive. Good aroma. |

In the above Table 1, the evaluation criteria for "texture" and "fragrance" are as follows.

With regard to "texture":

Symbol ○: The product had both a desirable feeling in the mouth and a non-adhesive (crisp, al dente) texture.

Symbol Δ: Although a somewhat non-adhesive (crisp, al dente) texture was felt, it was insufficient.

Symbol x: The texture was insufficient.

With regard to "fragrance":

Symbol ○: A strong flavor aroma was observed.

Symbol Δ: A somewhat strong flavor was observed, but it was insufficient.

Symbol x: The flavor was insufficiently strong.

As shown in Table 1, pyroglutamic acid was shown to have a good taste of gummy with an improved melt-in-the-mouth feeling, a good non-adhesive (crisp, al dente) texture, and a good flavor.

Evaluation 3

For Comparative Examples 1 and 2 and Examples 1 to 3, measurements of chewing time by 10 special panelists were performed. Chewing time was the mean value of the number of seconds from the beginning of chewing a gummy to being eliminated from the mouth. It can be judged that the shorter the time, the better the melt-in-the-mouth feeling.

Figure 8:
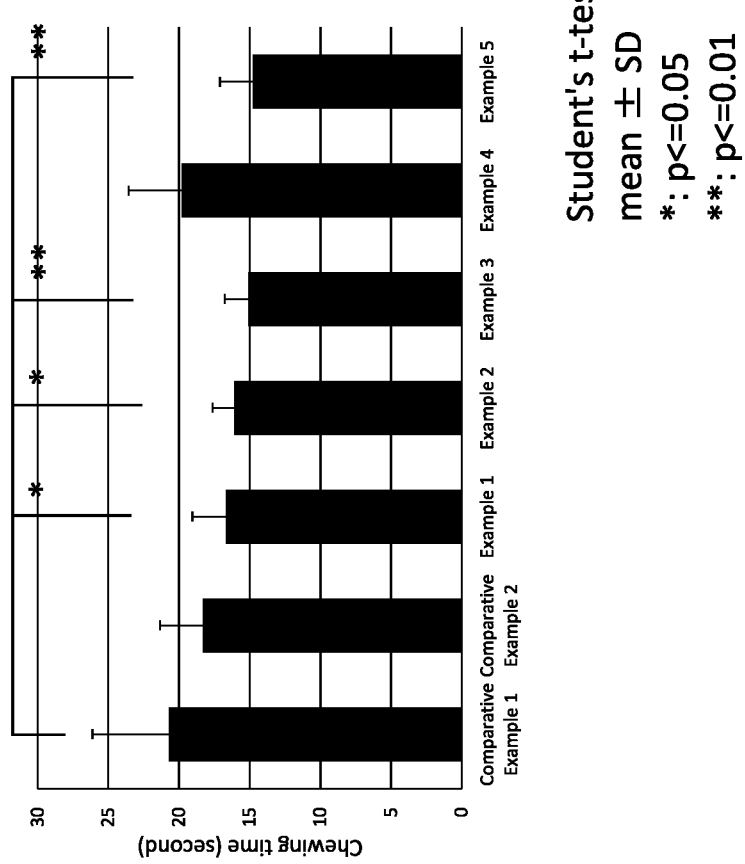
FIG. 8 shows a graph of the difference in time required for mastication.

The results are shown in FIG. 8. Comparative Example 1 was about 20.7 seconds and Comparative Example 2 was about 18.3 seconds. On the other hand, Example 1 was about 16.7 seconds, Example 2 was about 16.1 seconds, and Example 3 was about 15.1 seconds. The melt-in-the-mouth times of Examples 1-3 were significantly shorter than Comparative Example 1.

From these results, it was proven that pyroglutamic acid had the effect of shortening the melt-in-the-mouth time.

Evaluation 4

For Comparative Examples 1, 2, and Examples 1-3, a melt-in-the mouth evaluation was performed by a panel of 10 specialists. The mean score, which indicated a better melt-in-the-mouth feeling from −2 to +2 on the score after eating a gummy, was evaluated by the specialists. Higher scores indicate a higher (better) value of the melt-in-the-mouth feeling.

Figure 9:
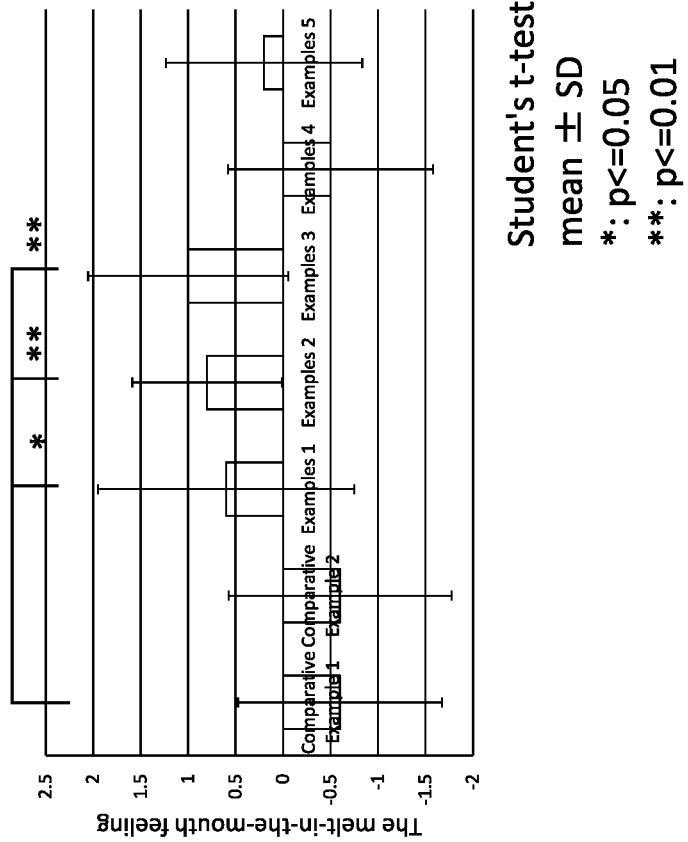
FIG. 9 shows a graph of the results for sensory evaluation with regard to the melt-in-the-mouth feeling.

The results are shown in FIG. 9. In comparison, the mean scores both Comparative Examples 1 and 2 were −0.6 points, whereas Example 1, Example 2, and Example 3 were 0.6, 0.8, and 1.0 points, respectively. There was no significant difference between Comparative Examples 1 and 2. On the other hand, in Examples 1-3, the melt-in-the-mouth feeling was significantly better than in Comparative Example 1.

From these results, it was proven that pyroglutamic acid had the effect of improving the melt-in-the-mouth feeling.

Evaluation 5

In each of the examples of Comparative Examples 1 and 2 and Examples 1 to 3, thirty (30) gummy candies were placed in a transparent glass vessel, corked with a lid, and stored at 25° C. for 1 month. After storage, it was judged whether the individual gummy candies agglomerated (adhered, clumped) or not.

As a result, for Comparative Examples 1 and 2, individual gummy candies were agglomerated, and could not be disaggregated (separated). Although Example 1 contained agglomerated gummy candies, it was found that there was an inhibitory effect on the aggregation, since the individual gummy candies could be separated with time and effort. For Examples 2 and 3, the individual gummy candies had agglomerated, but could be easily separated.

These results indicate that pyroglutamic acid is effective in inhibiting the aggregation of gummy candy during storage.

Thus, according to the embodiments, a new gummy candy with an improved melt-in-the-mouth feeling and a non-adhesive (crisp, al dente) texture, and a good fragrant taste at the time of eating could be provided. Further, it was possible to provide a manufacturing method for mass producing a gummy composition that inhibits adhesion to the manufacturing apparatus during manufacturing and inhibits aggregation (adhesion) between gummy candies after the manufacture.

I claim:

1. A gummy composition formed as a gummy candy and comprising 0.08-1.5 mass % of pyroglutamic acid.

2. The gummy composition according to claim 1, further comprising a gelling agent.

3. The gummy composition according to claim 2, wherein the gelling agent contains gelatin and/or pectin.

4. The gummy composition according to claim 2, further comprising a saccharide or a sugar substitute.

5. The gummy composition according to claim 2, further comprising a fruit juice and/or a vegetable juice.

6. The gummy composition according to claim 1, wherein at least a majority of the pyroglutamic acid is L-pyroglutamic acid.

7. The gummy composition according to claim 2, further comprising a vitamin, a mineral or an herbal medicine.

8. The gummy composition according to claim 2, further comprising a pharmaceutical composition.

9. The gummy composition according to claim 2, further comprising a coloring agent, a flavoring agent and/or a fragrance.

10. The gummy composition according to claim 2, further comprising an acid.

11. The gummy composition according to claim 10, wherein the acid is citric acid.

12. The gummy composition according to claim 2, wherein the gummy composition is an edible, chewable, elastic composition in the form of a shaped solid unit and at least a majority of the pyroglutamic acid is L-pyroglutamic acid.

13. The gummy composition according to claim 12, further comprising a sweetener, an acid, a flavoring agent and a fragrance.

14. The gummy composition according to claim 13, wherein the sweetener comprises sucrose and the acid comprises citric acid.

15. The gummy composition according to claim 14, further comprising a fruit juice.

16. The gummy composition according to claim 1, further comprising an emulsifier and a gelling agent.

17. The gummy composition according to claim 1, wherein the gummy composition is an edible, chewable, elastic composition in the form of a shaped solid unit.

18. The gummy composition according to claim 17, further comprising gelatin in the form of a matrix.

19. The gummy composition according to claim 18, further comprising citric acid.

20. The gummy composition according to claim 19, further comprising sucrose and fruit juice.

* * * * *